United States Patent
Pagani

(10) Patent No.: US 12,056,569 B2
(45) Date of Patent: Aug. 6, 2024

(54) PROCESS FOR CREATING A SIMPLIFIED LABEL FOR FOOD PRODUCTS

(71) Applicant: Stefano Pagani, Bagnacavallo (IT)

(72) Inventor: Stefano Pagani, Bagnacavallo (IT)

( * ) Notice: Subject to any disclaimer, the term of this patent is extended or adjusted under 35 U.S.C. 154(b) by 0 days.

(21) Appl. No.: 18/173,370

(22) Filed: Feb. 23, 2023

(65) Prior Publication Data

US 2023/0281409 A1 Sep. 7, 2023

(30) Foreign Application Priority Data

Mar. 1, 2022 (IT) .......................... 102022000003827

(51) Int. Cl.
| | |
|---|---|
| *G06K 7/10* | (2006.01) |
| *G06F 16/51* | (2019.01) |
| *G06K 1/12* | (2006.01) |
| *G06K 7/14* | (2006.01) |

(52) U.S. Cl.
CPC ........... *G06K 7/1417* (2013.01); *G06F 16/51* (2019.01); *G06K 1/121* (2013.01); *G06K 7/1413* (2013.01)

(58) Field of Classification Search
CPC ............. G06Q 10/087; G06Q 20/3674; G06Q 30/0185; G06K 7/1434; G06K 7/1417; G06K 1/121; G06K 19/06028; G06K 7/1413
USPC .................................... 235/462.01, 454, 385
See application file for complete search history.

(56) References Cited

U.S. PATENT DOCUMENTS

| | | | |
|---|---|---|---|
| 10,783,601 B1 * | 9/2020 | Rodriguez | G06T 1/0028 |
| 2006/0015904 A1 * | 1/2006 | Marcus | H04N 7/16 348/E7.071 |
| 2009/0303036 A1 * | 12/2009 | Sahuguet | G06F 16/434 340/539.13 |
| 2013/0018761 A1 | 1/2013 | Kwak | |
| 2013/0097085 A1 * | 4/2013 | Peckover | G06F 21/73 705/50 |
| 2019/0197278 A1 | 6/2019 | Kastury | |
| 2019/0332840 A1 * | 10/2019 | Sharma | G06K 7/1447 |
| 2020/0285825 A1 * | 9/2020 | Smith | G06V 10/25 |

FOREIGN PATENT DOCUMENTS

CN 111652337 A 9/2020

OTHER PUBLICATIONS

Italian Search Report for corresponding IT 102022000003827 dated Oct. 19, 2022.

* cited by examiner

*Primary Examiner* — Daniel St Cyr
(74) *Attorney, Agent, or Firm* — Egbert, McDaniel & Swartz, PLLC

(57) ABSTRACT

A process for creating a simplified label for food products includes the following steps: retrieving from a supplier a complete paper label, creating a digital image of the complete paper label and storing the digital image in a database, generating a code associated with the digital image, printing a simplified label comprising the generated code, applying only the simplified label on a food product, reading the generated code and retrieving the information associated with the generated code in the database, displaying the information stored in the database.

14 Claims, No Drawings

PROCESS FOR CREATING A SIMPLIFIED LABEL FOR FOOD PRODUCTS

CROSS-REFERENCE TO RELATED APPLICATIONS

Not applicable.

BACKGROUND OF THE INVENTION

1. Field of the Invention

The present patent application for an industrial invention relates to a process for creating a simplified label for food products. The reference sector is the catering sector, where it is necessary to maintain the traceability of information written on labels associated with food products.

2. Description of Related Art Including Information Disclosed Under 37 CFR 1.97 and 37 CFR 1.98

It is known that, in the catering sector, it is essential to be able to trace the path of a food product. Tracing the path of a food product means being able to reconstruct the production steps of said food product.

Reconstructing the path of a food product backwards is essential in order to be able to isolate a production batch in the event of an emergency and to be able to manage and control any dangerous situations.

Information about the traceability of a food product is written entirely on a paper label associated with the food product.

It is necessary for a restaurateur to keep all paper labels of food products in stock.

It should be noted that food products can be simple food products and prepared food products, i.e. comprising two or more simple food products. Paper labels of all simple food products comprised in the prepared food product must be applied to a prepared food product.

Paper labels must be kept intact and clearly visible until the food product runs out.

A first drawback of the known paper labels consists in that the paper label can be lost or damaged, to the point of no longer being visible. In this case, it is no longer possible to find information on the traceability of the food product.

A second drawback of the known paper labels consists in that these paper labels are large in size since they comprise all the traceability information. Therefore, the known paper label is impractical to use and complex to apply to small food products. Furthermore, in order to be able to apply the paper label on small food products, this traceability information is printed on the known paper labels with small fonts. In this way, the known paper label is difficult to read.

A third drawback of the known paper labels consists in that the storage operations of the food product are long and complex since, with each use, it is necessary to keep the paper label of said food product and then reapply it to the food product before storing it.

A fourth drawback of the known paper labels consists in that the operations necessary for storing a prepared food product are long and complex, since they involve photocopying the paper label of each simple food product comprised in the prepared food product and applying all the paper labels of said simple food products on the prepared food product.

These operations are even more complex when a simple food product is comprised in several prepared food products.

Indeed, in this case, it is necessary to photocopy the paper label of a simple food product several times, so as to apply said photocopied paper labels on the prepared food products, comprising said simple food product.

Furthermore, paper labels, being bulky, take up space on the prepared food product. Therefore, in order to be able to apply the paper labels of all plain food products on the prepared food product, the traceability information is printed on the paper labels of plain food products with small fonts. In this way, paper labels are difficult to read.

US2019/0197278 discloses a method for retrieving information by a consumer by reading a code affixed to a product label. The code is preferably not visible to the naked eye. By reading the code, a database is queried so that the consumer can view information about the product. The information on the database is entered by a manufacturer, a wholesaler or a third party for quality control, that is, by a figure upstream of a production chain of the product with respect to the consumer.

US2013/0018761 discloses a method for tracking and managing information relating to food sources. A manufacturer enters food product information into a server. The server associates this information with a unique identification code printed on a label. The label comprising the identification code is placed on the product, in addition to a traditional label, so as to be used by a consumer, i.e. a figure downstream of the food product production chain with respect to the producer, to find traceability.

CN111652337 describes a method for retrieving information about a product by a consumer by scanning a code on a label.

The methods described in US2019/0197278, US2013/0018761 and CN111652337 require a manufacturer and/or wholesaler to enter the traceability information directly into the database and create the simplified label comprising the code. The consumer, i.e. an end user, therefore has the label directly available containing the code through which he/she can access the traceability information written in the database. However, usually the manufacturer and/or wholesaler do not provide the user with the label comprising the code.

Furthermore, the traceability information relating to the food product is entered into the database by a figure upstream of the production chain of a food product with respect to the consumer who reads the label. Therefore, these methods are complex and difficult to manage since it is necessary to provide means of authentication, permission management and information access management so that the consumer cannot modify the traceability information in the database or add new traceability information to the database relating to the food product.

BRIEF SUMMARY OF THE INVENTION

The object of the present invention is to overcome the drawbacks of the prior art by providing a method which allows a user to produce a simplified label for food products to find traceability information in a simple, fast, safe and reliable manner.

Another object is to provide a method which allows a user to store information and to find such traceability information relating to a food product in a simple and quick manner.

Another object is to provide a method which allows not to lose the traceability information of the food products and to produce space-saving labels.

A further object is to provide a method which allows to speed up and simplify the storage operations of the food product.

These objects are achieved according to the invention with the features listed in the appended independent claim 1.

Advantageous embodiments appear from the dependent claims.

The process according to the invention is defined by claim 1.

The advantages of the process according to the invention are evident, in which thanks to the step of finding said at least one complete paper label and to the step of creating the digital image of said at least one complete paper label and storing said digital image in a database, one can replace the full paper label with the simplified label. In this way, there is no risk of losing traceability information, since the digital image of said at least one complete paper label is stored in the database.

Therefore, the method according to the invention is practical, fast, efficient, reliable and easy to implement.

DETAILED DESCRIPTION OF THE INVENTION

A process according to the invention for creating a simplified label for food products starting from a complete paper label is described below.

The process according to the invention comprises a step for obtaining a complete paper label, comprising written traceability information relating to a food product.

More precisely, a user downstream of a food product production chain obtains a food product from a supplier comprising the complete paper label comprising written traceability information relating to a food product. More precisely, by downstream user of the food product production chain we mean an activity dedicated to the preparation of food supplied by the supplier and a set of services connected to this activity, such as, for example, services for monitoring compliance with regulations relating to the preservation of food products within said activity. By supplier we mean an activity of production of food products and wholesale sale of said food products. The supplier is upstream of the food product production chain with respect to the user.

The process according to the invention comprises a step of storing information relating to a food product in a database. The information comprises a digital image of the complete paper label.

The step of storing information relating to a food product in a database comprises a step of creating a digital image of the complete paper label and storing said digital image in a database.

In other words, the user creates the digital image of the complete paper label of a food product. Subsequently, the user has write access to the database and stores said digital image in the database.

More precisely, the step of creating a digital image of said at least one complete paper label and storing said digital image in a database comprises a step of creating a photograph of said at least one complete paper label using a digital camera. The digital camera can be comprised in a smart device, such as a smartphone, tablet or computer, or it can be a digital camera.

The database can be comprised in the smart device which also comprises the digital camera or it can be comprised in an external storage device, such as for example a server or an online storage space.

If the database is comprised in the smart device comprising the digital camera, the step of creating a digital image of said at least one complete paper label and storing said digital image in a database comprises a step of storing the digital image in the database of the smart device, comprising the digital camera.

If the database is comprised in an external storage device, the step of creating a digital image of said at least one complete paper label and storing said digital image in a database comprises a step of sending the digital image from the digital camera to the external storage device and storing the digital image in the external storage device database.

In particular, if the external storage device comprises a transceiver device, for example of the wireless type, and the digital camera comprises a transceiver device, for example of the wireless type, the digital image is:

sent from the digital camera via the digital camera transceiver device to the external storage device, received from the transceiver device of the external storage device, and stored in the database of the external storage device.

Alternatively, the digital image is sent from the digital camera to a temporary storage device, such as an SD card or external hard drive, connected to the digital camera. The temporary storage device is connected to the external storage device. The digital image of the completed label is sent from the temporary storage device to the external storage device. The digital image is stored in the database of the external storage device.

Alternatively, the step of creating a digital image of said at least one complete paper label and storing said digital image in a database comprises a step of scanning the complete paper label by means of a scanner device and a step of storing the digital image in the database of the external storage device connected to the scanner device.

The process according to the invention comprises a step of generating a code associated with the information by means of a code generator, so as to obtain a generated code. More precisely, after having stored the digital image of the complete paper label, the user generates a code associated with the digital image of the complete paper label by means of a code generator, so as to obtain a generated code. Advantageously, the code generation step comprises a matrix code generation step, for example a QR code. Alternatively, the step of generating a code comprises a step of generating a bar code or an alphanumeric code. Advantageously, the code generator is comprised in the smart device. Thus, the step of generating a code comprises a step of generating the code by the smart device, comprising the digital camera and the database.

If the step of storing said digital image in a database and the step of generating a code occur in different time periods, the process according to the invention optionally comprises, before the step of generating a code, a step of selecting from the database the digital image the complete paper label. Said step of selecting from the database of the digital image the complete paper label is performed by the user. More precisely, the user accesses the database in reading and selects the digital image of the complete paper label from the database.

The process according to the invention comprises a step of printing, by means of a printer, a label comprising the generated code, associated with the digital image of the complete paper label, so as to obtain a simplified label. More precisely, the user prints the simplified label comprising the generated code. The code is printed on the simplified label with dimensions such as to be visible to the human eye.

Optionally, the simplified label further comprises information about the food product, such as for example the storage date of the food product and/or the type of food product. Therefore, optionally, the step of printing a label comprising the generated code, so as to obtain a simplified label, comprises a step of printing information about the food product on the simplified label.

Optionally, the step of printing a label comprising the generated code, so as to obtain a simplified label, comprises a step of printing an adhesive simplified label, optionally by means of a label printer.

The process according to the invention comprises a step of applying only the simplified label to a food product. Such step of applying only the simplified label to a food product comprises a step of replacing the complete paper label with the simplified label.

More precisely, the user applies only the simplified label to a food product, so as to replace the complete paper label with the simplified label. In other words, the complete paper label is removed from the food product and replaced with the simplified label, comprising the generated code associated with the digital image of the complete paper label, stored in the database.

It should be noted that the complete paper label is attached to an original packaging of the food product and, in some cases, the original packaging of the food product cannot be preserved or recycled. For example, if the food product must be vacuum-packed in order to be stored, the food product must be removed from the original packaging on which the complete paper label is attached. Therefore, the full paper label is removed and replaced with the simplified label, attached onto the new package.

Optionally, the process according to the invention comprises a step of positioning the food product in the warehouse with the simplified label applied to the food product.

In order to trace the traceability information written on the complete paper label, containing all the information relating to the food product, the process according to the invention comprises a reading step of the generated code, printed on the simplified label, by means of a code reader and retrieving the information associated with the code generated in the database, i.e. the digital image of the complete paper label. More precisely, the user reads the generated code printed on the simplified label, using a code reader, and accesses the database in reading, in order to find the digital image of the complete paper label associated with the generated code.

It is noted that the steps of:
creating a digital image of said at least one complete paper label and storing said digital image in a database;
selecting from the database the digital image of the complete paper label;
reading the generated code printed on the simplified label using a code reader;
are carried out by a user downstream of the food product production chain with respect to the supplier. In this way, the management and entry of traceability information along the production chain is simple and fast. Therefore, the process according to the invention is simple to implement. Advantageously, these steps are performed by the same user. In this way, it is not necessary to provide complex authentication, permission management and information access management means, given that the same user can both write the traceability information on the database and read said information on the database.

For example the steps of:
creating a digital image of said at least one complete paper label and storing said digital image in a database;
selecting from the database the digital image of the complete paper label;
reading the generated code printed on the simplified label using a code reader; are all carried out by the personnel of the activity dedicated to the preparation of food.

Alternatively, the step of creating a digital image of said at least one complete paper label and storing said digital image in a database is performed by the personnel of the food preparation business and the steps of selecting from the database the digital image of the complete paper label and reading of the generated code printed on the simplified label using a code reader are carried out by an inspector to verify compliance with regulations relating to the preservation of food products. In any case, both the personnel of the food preparation activity and the inspector are users downstream of the food product production chain with respect to the supplier who supplies the complete paper label.

Optionally, the step of reading the generated code comprises:
a step of using a matrix code reader, for example a QR code reader, if the generated code is a matrix code, for example of the QR type, in order to read the generated matrix code, or
a step of using a bar code reader, if the generated code is a bar code, in order to read the generated bar code, or
a step of using an input device for inputting an alphanumeric code, if the generated code is an alphanumeric code, so as to read the generated alphanumeric code.

Advantageously, the code reader is comprised in the smart device, which also comprises the digital camera, the database and the code generator.

The process according to the invention comprises a step of displaying the information stored in the database. The step of displaying the information stored in the database comprises a step of displaying the digital image of the complete paper label of the food product, stored in the database. More precisely, the user displays the digital image of the complete paper label of the food product, stored in the database.

In other words, when necessary, it is possible to view the digital image of the complete paper label, containing the written traceability information of the food product, by reading the generated code, printed on the simplified label and associated with the digital image of the complete paper label.

Advantageously, the digital image of the complete paper label is displayed on a screen of the smart device, which also comprises the digital camera, the database, the code generator and the code reader. In this way, with a single smart device it is possible to create and store in the database the digital image of the complete paper label, generate the code, read the code and view the digital image of the complete paper label.

The process according to the invention is also used to produce simplified labels for prepared food products, i.e. comprising several simple food products.

In this case, the step of finding a complete paper label comprises a step of finding a plurality of complete paper labels, each comprising written traceability information relating to a simple food product comprised in a prepared food product.

The step of creating a digital image of the complete paper label and storing said digital image in a database comprises a step of creating a digital image of each complete paper label and storing said digital images in a database, i.e. digital images of paper labels complete with all simple food products comprised in the prepared food product.

The code generation step comprises a step of generating a code associated with the digital image of the complete paper labels of the simple food products comprised in the prepared food product.

The step of applying only the simplified label to a food product comprises a step of applying only the simplified label to the prepared food product. The step of applying the simplified label only to the prepared food product comprises a step of replacing the complete paper labels of the simple food products with the simplified label.

The step of reading the generated code printed on the simplified label comprises a step of reading the generated code printed on the simplified label by means of the code reader, so as to find in the database the digital image of the complete paper labels associated with the generated code.

The step of displaying the digital image of the complete paper label comprises a step of displaying the digital image of the complete paper labels of the simple food products comprised in the prepared food products.

In this way, by reading the code applied to the prepared food product, the collection of digital images of the complete paper labels of the simple food products comprised in the prepared food product is displayed.

It should also be noted that a simple food product can be used for several prepared food products. In this case, the digital image of the complete paper label of the simple food product is associated with the generated code of each prepared food product comprising said simple food product.

The advantages of the process according to the invention are evident, in which thanks to the step of finding said at least one complete paper label and to the step of creating the digital image of said at least one complete paper label and storing said digital image in a database, one can replace the full paper label with the simplified label.

Moreover, there is no risk of losing such traceability information, since the digital image of said at least one complete paper label is stored in the database.

Therefore, the method according to the invention is practical, fast, efficient, reliable and easy to implement.

Furthermore, due to the fact that the process according to the invention is carried out by a user downstream of the food product production chain, with respect to the supplier who supplies the complete paper label, the process according to the invention is simple to implement, not having to coordinate the passage of information on a database along the food product production chain.

If it is the same user who, after entering the information relating to the food product in the database, retrieves said information from the database by reading the generated code printed on the simplified label, the process according to the invention is easy to implement, not being necessary to provide means of authentication, permission management and information access management, given that the user can both read the traceability information from the database and add said traceability information to the database, storing in the database the digital image of said at least one complete label.

Moreover, there is no risk of losing such traceability information, since the digital image of said at least one label is stored in the database.

The simplified label can furthermore be of small dimensions, since it is sufficient for the generated code to be printed on this simplified label. Therefore, this simplified label can also be easily applied to small food products.

Furthermore, thanks to the process according to the invention, the storage operations of the food product are quick, easy and convenient.

In the case of prepared food products, thanks to the simplified label, it is possible to view in a simple, fast and practical way the collection of digital images of the complete labels with all the simple food products comprised in the prepared food product. Therefore, a single simplified label of small dimensions is sufficient to display the traceability information of all the simple food products comprised in the prepared food product.

By virtue of the fact that the simplified label is placed on the food product, said food product complies with the laws and regulations relating to the preservation of food in premises used for catering. In fact, the simplified label allows to find the complete traceability information quickly and easily, written on the complete paper label, the image of which is stored in the database.

The present embodiment of the invention can be subject to modifications or variations in details within the reach of those skilled in the art, falling in any case within the scope of the invention expressed by the appended claims.

I claim:

1. A process for creating a simplified label for a food product from a complete paper label, the process comprising:
retrieving the complete paper label from a supplier, the complete paper label having written traceability information pertaining to the food product;
storing information relating to the food product in a database, the information being a digital image of the complete paper label, the step of storing information comprising creating the digital image of the complete paper label;
generating a code by a code generator corresponding to the stored information, wherein the step of creating the digital image is prior to the step of generating the code, the step of generating the code comprising generating a code corresponding to the complete paper label;
printing the simplified label having the generated code;
applying only the simplified label to the food product, the step of applying comprising replacing the complete paper label with the simplified label;
reading the generated code printed on the simplified label by using a code reader;
retrieving the stored information in the database corresponding to the generated code; and
displaying the stored information from the database.

2. The process of claim 1, wherein the steps of creating the digital image of the complete paper label and the storing of the digital image of the complete paper label and the reading the generated code are carried out by a user downstream of a food product distribution chain with respect to the supplier.

3. The process of claim 2, wherein the steps of creating the digital image of the complete paper label and the storing of the image of the complete paper label in the database comprises:
creating the digital image of the complete paper label by a user;
write-accessing the database by the user; and
storing the digital image in the database.

4. The process of claim 2, wherein the step of reading the generated code comprises:
read-accessing the database by the user so as to find the digital image of the complete paper label associated with the generated code.

5. The process of claim 1, wherein the step of generating the code comprises generating a matrix code, the step of reading the generated code comprising using a matrix code reader so as to read the generated matrix code.

6. The process of claim 1, wherein the step of generating the code comprises generating the bar code, the step of reading the generated code comprising using a bar code reader so as to read the generated bar code.

7. The process of claim 1, wherein the step of generating the code comprises generating an alphanumeric code, the step of reading the generated code comprising using an input device so as to input the alphanumeric code in order to read the generated alphanumeric code.

8. The process of claim 1, wherein the step of printing comprises printing a simplified adhesive label by a label printer.

9. The process of claim 1, wherein the step of creating the image of the complete paper label and the storing of the image of the complete paper label in the database comprises creating a photograph of the complete paper label by using a digital camera.

10. The process of claim 9, wherein the database is in an external storage device, the step of creating the digital image of the complete paper label and the step of storing the digital image of the complete paper label in the database comprises sending the digital image from the digital camera to the external storage device and storing the digital image in a database of the external storage device.

11. The process of claim 1, wherein the digital camera is in a smart device, the database is stored in the smart device.

12. The process of claim 1, wherein the step of creating the digital image of the complete paper label and the step of storing the digital image of the complete paper label comprises:
 scanning the complete paper label by a scanner device; and
 storing the digital image in a database of an external storage device, the external storage device being connected to the scanner device.

13. The process of claim 1, further comprising:
 selecting the digital image of the complete paper label from the database prior to the step of generating the code.

14. The process of claim 13, wherein the step of selecting comprising:
 read-accessing the database; and
 selecting the digital image of the complete paper label from the read-accessed database.

\* \* \* \* \*